United States Patent [19]
Felder et al.

[11] Patent Number: 5,591,348
[45] Date of Patent: Jan. 7, 1997

[54] DEVICE FOR THE CENTRAL FEEDING OF TANKS SUCH AS CIRCULAR GRIT TRAPS, GRIT CLASSIFIERS OR SETTLING TANKS OF CIRCULAR CONSTRUCTION

[75] Inventors: Anton Felder, Schlotthauerstrasse 5, D-8000 München 90; Franz Valentin, Munich, both of Germany

[73] Assignee: Anton Felder, München, Germany

[21] Appl. No.: 204,172
[22] PCT Filed: Jul. 21, 1993
[86] PCT No.: PCT/EP93/01390
§ 371 Date: Aug. 16, 1994
§ 102(e) Date: Aug. 16, 1994
[87] PCT Pub. No.: WO94/02251
PCT Pub. Date: Feb. 3, 1994

[30] Foreign Application Priority Data

Jul. 21, 1992 [DE] Germany .......................... 42 24 047.6

[51] Int. Cl.$^6$ .............................. C02F 1/24; B01D 21/26
[52] U.S. Cl. .................... 210/704; 210/738; 210/787; 210/512.1; 210/221.1; 210/221.2; 209/162; 261/123
[58] Field of Search ................... 210/703, 787, 210/704, 738, 747, 221.1, 221.2; 209/162, 163, 164, 166, 168, 170; 261/123, DIG. 75

[56] References Cited

U.S. PATENT DOCUMENTS

| 2,338,971 | 1/1944 | Ross | 210/539 |
| 4,477,341 | 10/1984 | Schweiss et al. | 210/221.2 |
| 4,759,854 | 7/1988 | Wilson | 210/221.2 |
| 5,075,001 | 12/1991 | Taylor | 210/519 |
| 5,139,662 | 8/1992 | Ozawa | 210/221.2 |

FOREIGN PATENT DOCUMENTS 159738  5/1940  Germany.

OTHER PUBLICATIONS

PTO 96–0364 (Translation of German Referednce No. 159738).

Primary Examiner—David A. Reifsnyder
Attorney, Agent, or Firm—George W. Dishong

[57] ABSTRACT

A device for centrically charging tanks (9) with a spin chamber (1, 10) connected to an inlet (20) and to a vertical downpipe (2, 12) ending seamlessly in a trumpet-shaped mouth (3, 18). Rotary flow charges circular settlement tanks and sand sorters and sedimentation tanks in such a way that the Coanda effect is activated at the trumpet-shaped mouth (3, 18) and in turn causes the rotary outflow of fluid from the vertical pipe (2, 12) to be diverted into the horizontal plane or vertically upwards as well as a radially symmetrical flow in the tank (9). There is a guiding pipe (14, 16) in the downpipe (2, 12) with preferably circular apertures around its periphery and which is open to the atmosphere at the top.

15 Claims, 4 Drawing Sheets

DEVICE FOR THE CENTRAL FEEDING OF TANKS SUCH AS CIRCULAR GRIT TRAPS, GRIT CLASSIFIERS OR SETTLING TANKS OF CIRCULAR CONSTRUCTION

BACKGROUND OF THE INVENTION

1. Field of the Invention

The invention relates to a device for the central feeding of tanks such as circular grit traps, grit classifiers or settling tanks of circular construction.

The subject of the invention is also a process for feeding such circular grit traps and grit classifiers and settling tanks of circular construction. Finally, the subject of the invention is also the use of the process and of the device for feeding circular grit traps and grit classifiers and settling tanks of round construction in sewage treatment plants.

2. Description of the Prior Art

For reasons of operational reliability, it is usually necessary, in the case of many waste-water and sludge treatment units of the sewage treatment plant, to separate the grits and other mineral substances, which have been entrained in the waste water, from the putrescible, organic substances. The conventional devices for degritting the waste water are, depending on construction type and operation, designated as deep, shallow, circular and aerated grit traps. In the case of the prior-art circular grit traps and grit classifiers of circular construction, the waste water is fed tangentially to a circular hopper-bottomed tank. After flowing through a centering angle of over 180°, the waste water passes into the outflow. The great disadvantage with conventional circular grit traps and grit classifiers of circular construction, however, is that, owing to the tangential introduction, the tank volume (region through which flow occurs effectively) provided is not utilized to the optimum degree and the hydraulic efficiency thereof is thus only approximately 50%.

The operating principle of conventional circular grit traps is based on the fact that, in curves, the bed load moves inside the curve. The forced circular motion causes, owing to the centrifugal force in the circular grit trap, a rise in the water level from the rotational axis outwards. Under the influence of the superatmospheric pressure in the edge zone, a circular motion, which is directed towards the center at the bottom, is thus superimposed in the throughflow. This results in a helical flow through the tank. Owing to the radial transverse flow, which is particularly strong at the bottom as a result of the reduced tangential velocity of the waste water there, the grit which has sunk to the bottom is conveyed into the hopper-shaped collecting chamber, in the axis of which there is arranged at least one cylindrical pump pit with mammoth pumps.

SUMMARY OF THE INVENTION

The object of the invention is to provide a device with a central feeding of such circular grit traps and grit classifiers and settling tanks of round construction which is of simplified design, such that, with the same inflow quantity and the same settling volume, an increase in the hydraulic efficiency from 50% to 90% is achieved.

It is further the object of the invention to specify such a process for central feeding, in which the efficiency is improved.

This is achieved in the case of a device for the central feeding of such tanks having a swirl chamber which is connected to the inflow and is in connection with a vertical gravity outlet pipe, a trumpet-shaped body widening from a transition region adjoining the gravity outlet pipe in a seamless manner, in that rotary flow having angular momentum is utilized for feeding circular grit tanks and grit classifiers and settling tanks such that there is activated, at the trumpet-shaped body widening from the transition region, the Coanda effect which, for its part, causes a deflection of the liquid stream, emerging from the vertical pipe and having angular momentum, at least in the horizontal direction or vertically upwards and also causes a radially symmetrical drain-off in the tank, and in that there is arranged, in particular, a conduit pipe, centrally in the gravity outlet pipe, which has preferably circular openings over its circumference and is open at the top towards the atmosphere.

By trumpet-shaped body or widening, it is understood by those of ordinary skill, particularly in view of the drawing figures that the bell shaped body to which is attached the vertical pipe is somewhat similar in appearance and geometry to the bell end of a horn such as for example a trumpet. The surface geometry of this bell shaped or trumpet-shaped body or widening, is such that angles ($\beta$) formed by tangent lines to the inner facing surface of the bell and the horizontal will go successively from about 90 degrees to about 0 degrees. The tangent lines, starting at a transition region, that is the region where the tangent lines would be changing from substantially vertical toward horizontal in a smooth manner and moving toward a detachment edge of the bell. Thus the angles formed by such tangent lines basically and successively go from axially directed to radially directed moving from the transition region to the detachment edge.

It is not denied that processes are known per se which cause a separation of the mineral constituents from the waste water by utilizing the force of gravity and centrifugal force. In these, however, feeding is not carried out centrally from the top with the simultaneous utilization of a swirl motion and the so-called Coanda effect.

It is known that the hydraulic efficiency of circular grit traps and grit classifiers and settling tanks of circular construction is coupled with the region through which flow occurs effectively and the average flow velocities. Instead of the desired 80%, only a hydraulic efficiency of 50% could thus be achieved, in practice, with the conventional structures. From this point of view, the measure taken by the invention signifies a considerable step forwards.

Furthermore, it is generally known that rotational symmetry cannot be presupposed during flow through the tank since a tangential incoming flow does not stabilize the vortex axis to a sufficient extent. In the actual flow area, the flow center is thus twisted helically and the separating surface is unstable.

The advantages achieved by the invention consist, in particular, in that the rotational symmetry is better utilized by the central feeding from the top. A further advantage is that, after leaving the vertical pipe at the edge of the trumpet-shaped or toroidal body, the liquid phase having angular momentum is deflected and guided by utilizing the Coanda effect and can thus be precisely anticipated. At the same time, in addition to the force of gravity, a centrifugal force acts on the mineral constituents, entrained in the liquid phase, owing to the deflection on the toroidal body i.e., the trumpet-shaped body. When the liquid phase is deflected, the grit particles are thus forcibly flung out of said phase and immediately sink in the direction of the base. It is also of great import that the liquid stream, has angular momentum, produced by the swirl chamber.

Expediently, we the swirl utilized [sic] such that swirl effect and Coanda effect are intensified synergistically. "Coanda effect" means the deflection of a jet towards a curved wall. The jet is deflected from its original direction and will attach itself to neighboring body surfaces and also follow any sharp changes in direction without separation. The attachment is based on a subatmospheric-pressure effect in the region of the wall-side jet edge. By Coanda effect, according to the definition, the following is understood: the characteristic or capability of free-fluid-flows having small cross-sections to lay itself or apply itself to vicinal body surfaces and also to follow severe alterations of directions of the surface structure without any peeling off (i.e., without separating from that surface).

An exteriorly similar design has been disclosed by German Patent Specification 159738. In this case, inflow does take place into a gravity outlet pipe likewise via a swirl chamber, the motion is converted into a rotating motion, but the rotational motion according to German Patent Specification 159738 serves to trigger centrifugal forces in the gravity outlet pipe in order that the heavier particles are deposited outwardly. The design comprises a gravity outlet pipe which is immersed in a separating tank and has lateral openings above the mouth (nozzle), and the nozzle part is arched in a bell-like manner, the openings thus being taken sideways as compulsory channels. After reaching the top lateral annular opening, the heavier particles between the gravity outlet pipe, widened in the form of a nozzle, are then scattered into the separating tank in the horizontal direction, whereas the lighter particles pass, for scattering out, through the interior of the nozzle beneath the heaviest particles. The heavy particles ostensibly serve as a filter for the lighter particles. The nozzle thus forcibly deflects the liquid jet.

This is not the case with the device according to the invention, in which, once at the edge of the trumpet-shaped body, the Coanda effect is forced to take place and, in addition to the force of gravity, a centrifugal force acts on the constituents, entrained in the liquid phase, owing to the deflection. When the liquid phase is deflected, the grain particles are thus forcibly flung out of said phase and immediately sink. Moreover, in the case of the present invention, special bodies such as separate nozzle bodies or the like are dispensed with.

It is, on the other hand, not denied that utilization of the Coanda effect within the specialist field is already known, albeit in a different step of the purifying process and for a different purpose. Applicants' own U.S. Pat. No. 5,422,017, issued Jun. 6, 1995 is based upon DE GM 9112947 German Patent No. 41 34 388 and defines and describes the use of the so-called Coanda tulip for central charging of circular tanks with sewage water. A centrally inserted horizontal circular control disc in the region of the transition from the verical pipe to a smoothly continuously adjoining bell shaped component.

Of course, there are also considerable advantages according to the invention if a conduit pipe is not used.

If use is made of such a central conduit pipe, which passes from the top side of the swirl chamber to just above the water level in the gravity outlet pipe (tank water level), then the vortex axis can additionally be stabilized successfully. If, in addition, the conduit pipe is provided with holes of corresponding size distributed-uniformly over the circumferential surface, then the size of the air bubbles and of the air supply can be influenced. In combination, the conduit pipe centrally positioned within the vertical gravity pipe creates an annular gap at the input (small diameter end) end—the transition region. The fluid emerging from this annular gap "hugs" the inner surface of the trumpet-shaped body (widening)thus being deflected from vertical towards the horizontal. This combination of the vertical pipe and the conduit pipe therewithin, while not essential to the creating of the Coanda effect, enhances the performance because the fluid is caused to be proximate the inner curving wall of the bell-shaped or trumpet-shaped body.

In a development of the invention, the vortex axis can be stabilized if the conduit pipe is designed in a manner corresponding to the form of a vortex sink.

If an upstream immersed baffle is additionally fitted at a defined distance from the tank edge, then floating substances and greases may advantageously be retained. Owing to the circular motion of the tank flow, the floating substances and greases can be discharged at a certain point by adeptly fitting an inner immersed baffle additionally running helically in the direction of the center.

A further configuration of the invention consists in taking the upstream immersed baffle until it reaches as far as the tank cover and connecting it rigidly thereto. When the separator is full, an air cushion in which the floating substances and greases circulate consequently forms within the upstream immersed baffle, beneath the tank cover. The underside always remains dry, and unpleasant, aggravating odors owing to putrefying grease are thus avoided.

The subject of the invention is also a process for the central feeding of circular grit traps, in which a swirl is produced in order to activate the so-called Coanda effect, and the Coanda effect is utilized such that it serves, for its part, for separation of the mineral constituents entrained in the liquid phase and for the decelerated and uniform introduction, having angular momentum, into the circular tank, and the [sic] an air intake is provided in the center of the vortex core arising as a result of the tangential introduction.

The swirl is preferably utilized such that swirl effect and Coanda effect are intensified synergistically.

Use can be made of such a device or such a process for clarifying waste water, in general for liquid/liquid separation, the separation of solids and liquids, for example as grease trap, or for the separation of shredded refuse and sewage, or as petrol separator. Usually, the device according to the invention, in the first-described embodiments, is utilized for separation of the mineral constituents entrained in the liquid phase and for the decelerated and uniform introduction, having angular momentum, into the circular tank.

In contrast, the arrangement of an aerating system has often been necessary up until now in order that the organic constituents in the water did not settle in the circular grit trap, but this involved high costs.

By preferably fitting an air-supply opening on the top side of the swirl chamber according to the invention, on the other hand, an air compressor can be dispensed with, since, in this region, air passes into the liquid flow as a result of subatmospheric pressure. Conventional tanks having a capacity of 4.5 $m^3$ were no more efficient than the special circular tank according to the invention, having a capacity of 0.9 $m^3$. The efficiency was the same in both cases. The particle sizes of less than 0.2 mm which can only be achieved with difficulty with known devices compare with the particle sizes of 0.125 mm which can readily be achieved according to the invention. The devices (P 4134388.3) defined in Applicants' own U.S. Pat. No. 5,422,017, for feeding circular tanks by waste water operated with an inserted, horizontal, circular plate cam which can now be totally dispensed with.

The abovementioned upstream immersed separating baffle at a defined distance from the tank edge gives rise to a particularly favorable separation in the case of an open top gravity discharge.

If the upstream immersed baffle reaches as far as the tank cover and is connected rigidly and in a sealed manner thereto, then, when the separator is full, an air cushion in which the floating substances and greases circulate consequently forms within the upstream immersed baffle beneath the tank cover.

In a development of the invention, the tank wall as such can be taken as far as the cover, as a result of which the necessity for a separate upstream immersed baffle is eliminated. Peripheral slots in the tank wall permit a pressure discharge of the liquid to a pipe which encircles the tank and is connected to the slots.

The space exhibiting floating substances and containing air in an increased state of compression and located above the liquid level can be emptied via a discharge pipe which opens discontinuously. If the pipe is suddenly opened approximately every hour, then the contents (the gas or the air and the sludge deposited in the floating layer) shoots outwards through the pipe. Pumps or the like are not necessary, which signifies a further great advantage of the invention.

The invention with or without conduit pipe can be used for tanks of the abovementioned type for liquid/liquid separation, the separation of solids and liquids, for example as grease trap, or the separation of shredded refuse and sewage, or as petrol separator. The diameter of the openings of the conduit pipe can, at most, be equal to d/2 (conduit pipe). The regulation of the air supply to the conduit pipe can take place via a ballcock, throttle valve, which may also be self-regulating, or any suitable member.

By way of example, embodiments of the invention are now to be illustrated in more detail with reference to the accompanying drawings, in which:

DETAILED DESCRIPTION OF THE INVENTION

Figure 1:
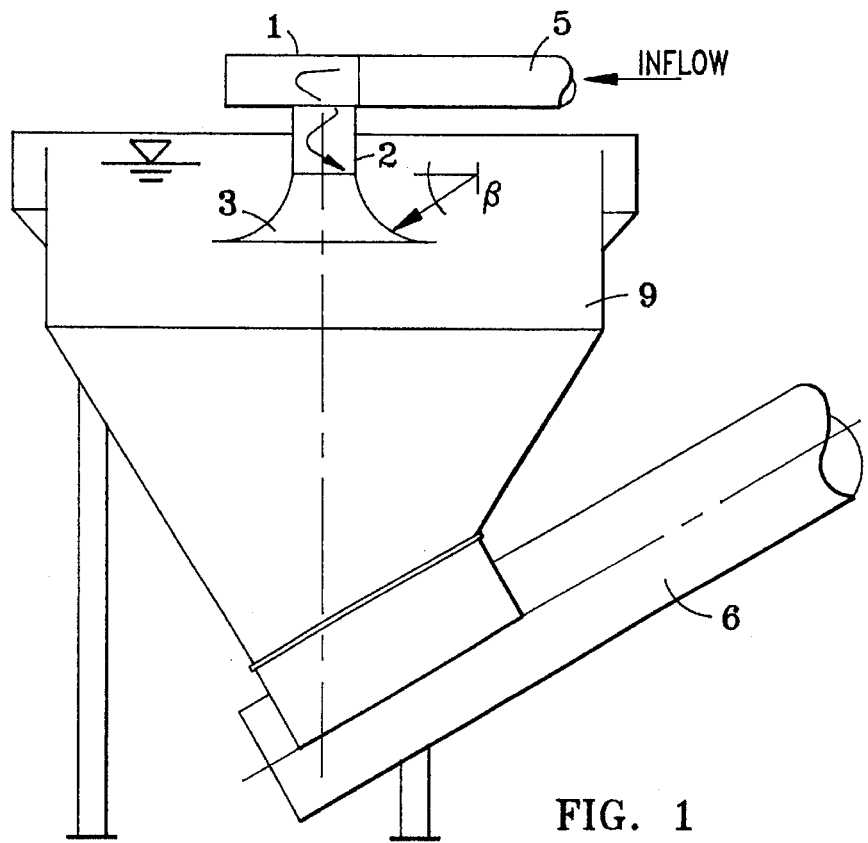
FIG. 1 shows a schematic view of a first embodiment, which serves predominantly as grit classifier.
Figure 2:
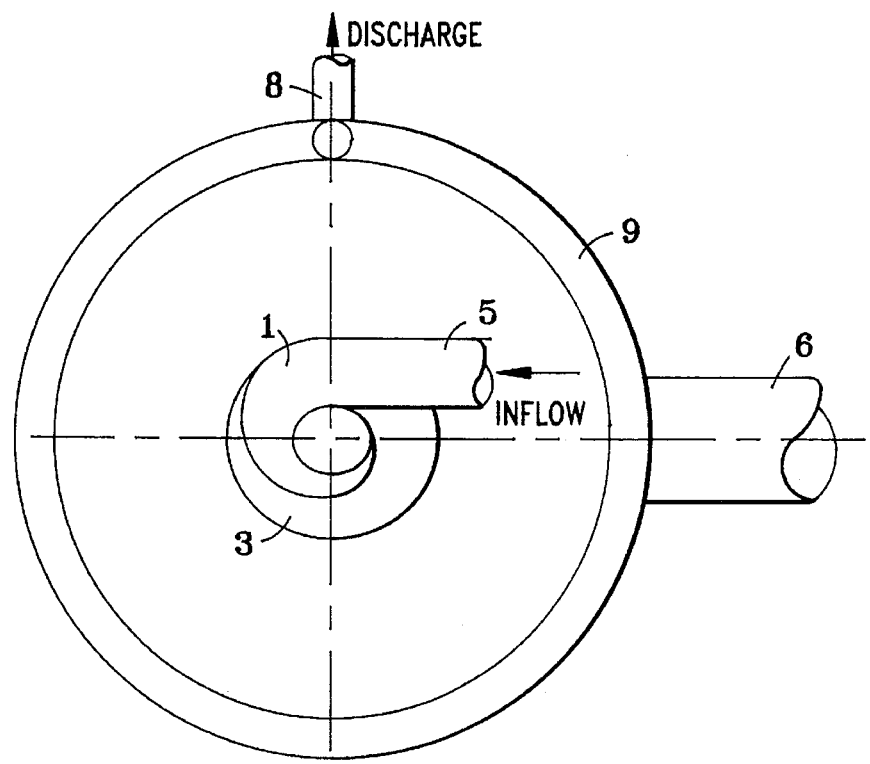
FIG. 2 shows a plan view of FIG. 1.

The embodiment represented in FIGS. 1 and 2 shows a circular tank 9 with central feeding. A horizontal inflow is connected, in a transition-free manner, to a swirl chamber 1. Onto the swirl chamber 1 there is attached a vertical pipe 2 which merges, in a transition-free manner, into a trumpet-shaped widening 3 (both in the vertical axis of the overall diagram). A classifying worm 6 known per se is located at the bottom of the circular tank 9, at a hopper-like constriction. The circular tank is provided with a discharge 8. The helical configuration of the inflow is shown clearly in FIG. 2.

According to the invention, the waste water flows horizontally to the swirl chamber 1. In the swirl chamber, the liquid stream is subjected to swirling, whereupon it flows through the vertical pipe 2 in helical motion. At the end of the vertical pipe 2, the swirl intensifies the flow through the trumpet-shaped arching and thus intensifies, synergistically, the attachment of the jet to the trumpet-shaped inner curve and thus the deflection downwards, in a radial direction and even upwards. Deflection angle $\beta$ characterizes or represents the angle of the tangent line to the inner surface of the bell shaped body or trumpet-shaped widening. Clearly this angle could be of different value depending upon application. An obvious method of varying the deflection angle $\beta$ would be to make the bell shaped body replaceable by providing for the removeable attachment of the bell shaped body to the output end of the vertical pipe, i.e., at the region of transition. The bell shaped body would connect to a mateable edge providing for a smooth and continuous transition from vertical to almost horizontal. There may be provided a variety of bell shaped bodies, i.e., trumpet-like bodies, each of which would have a different geometry such that the deflection angle $\beta$ is thereby different. The flow at the edge of the trumpet-like body may thus be directed from nearly vertical to substantially horizontal. Finally, the liquid jet having angular momentum flows, after deflection, into the circular tank.

A grit classifier of this type can operate with a circular tank of, for example, 1.5 m in diameter, with a height of not more than 1.6 m diameter [sic] and a circular-tank capacity of 1.5 m$^3$.

The entire tank is thus activated by:

centrifugal force, caused by the swirl chamber, acting on the waste water and producing a helical motion, centrifugal force, owing to deflection at the Coanda trumpet (particles are flung out), and centrifugal force owing to a rotary flow, having angular momentum, in the tank.

Figure 3:
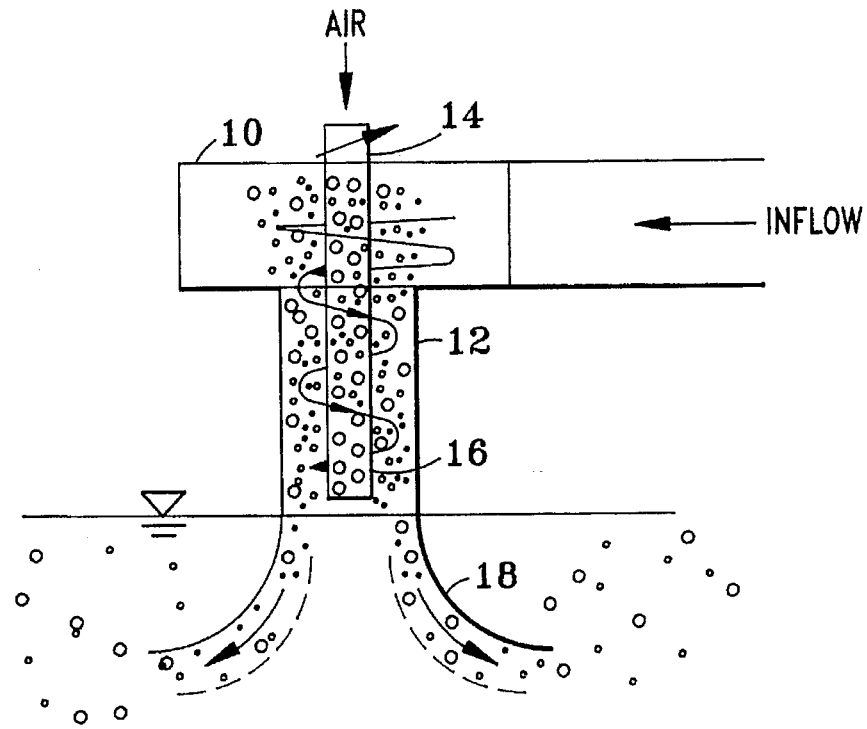
FIG. 3 shows a variant of the embodiment shown in FIG. 1, with the arrangement of a conduit pipe.

According to FIG. 3, flow takes place into a swirl chamber 10. From the swirl chamber 10, liquid passes into a gravity outlet pipe 12 which has a trumpet-shaped widening 18.

Reaching into the gravity outlet pipe there is provided a conduit pipe 14, to be precise centrally in the gravity outlet pipe. The conduit pipe is open at the top, but has an air regulating system. Over its circumference, the conduit pipe bears openings which can be adapted to requirements. Air is conveyed, in the form of bubbles, from the passing liquid stream into the circular tank since a vortex core inevitably occurs in the axis of the gravity outlet pipe, said vortex core otherwise circulating eccentrically. With increasing centrifugal acceleration, more openings are released. It can be seen clearly how the liquid stream is attached to the Coanda Tulip and, when the liquid phase is deflected, the grit particles are thus forcibly flung out of said phase and immediately sink.

Figure 4:
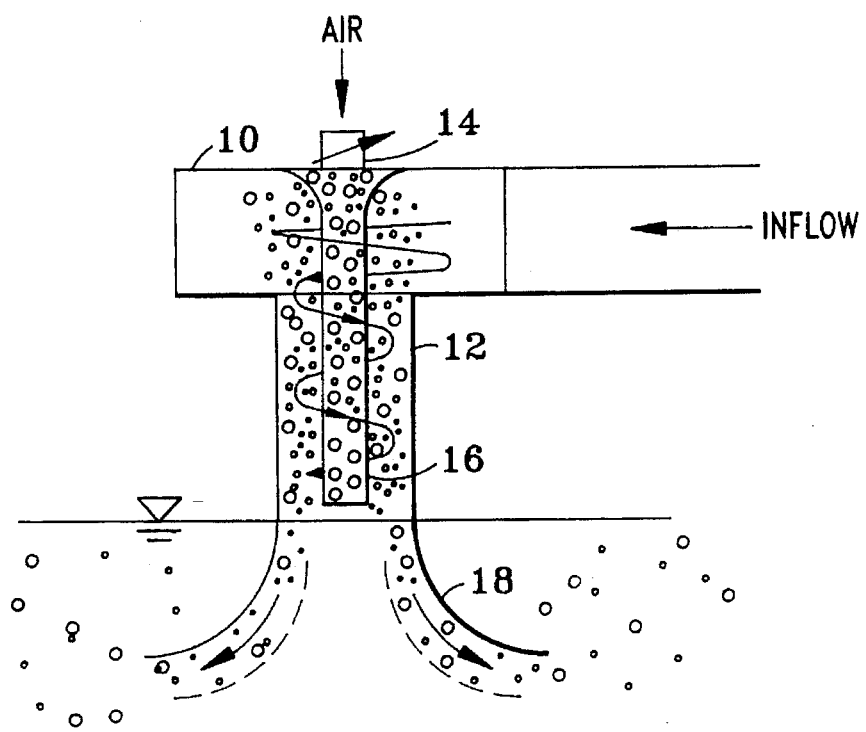
FIG. 4 shows a variant of FIG. 3, with a differently configured conduit pipe.

FIG. 4 shows an embodiment similar to FIG. 3. Here, too, a conduit pipe 16 is provided in the gravity outlet pipe 12 and is again provided with openings over the circumference, but it is designed in the manner of a vortex sink, i.e. at the top it has a large trumpet opening which continues downwards into the gravity outlet pipe into the pipe [sic].

Figure 5:
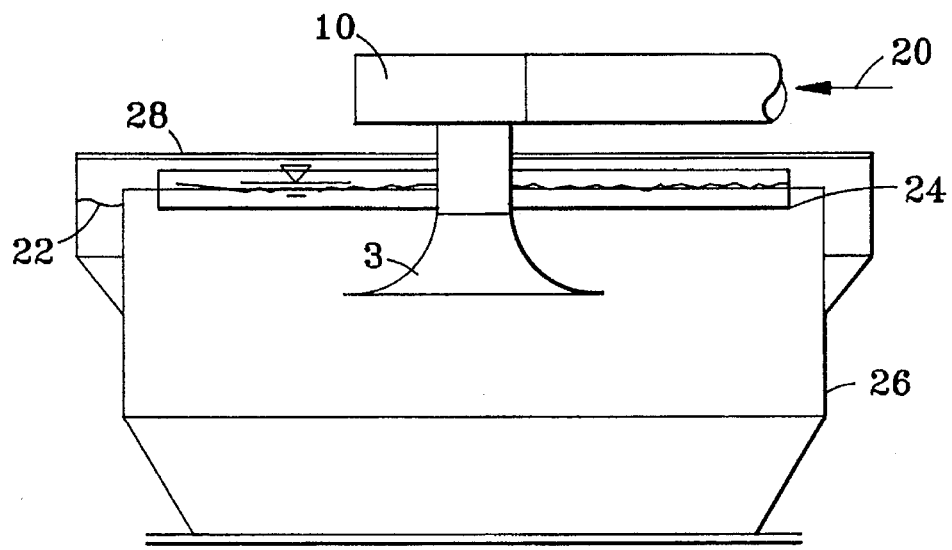
FIG. 5 shows an embodiment with immersed baffle.
Figure 6:
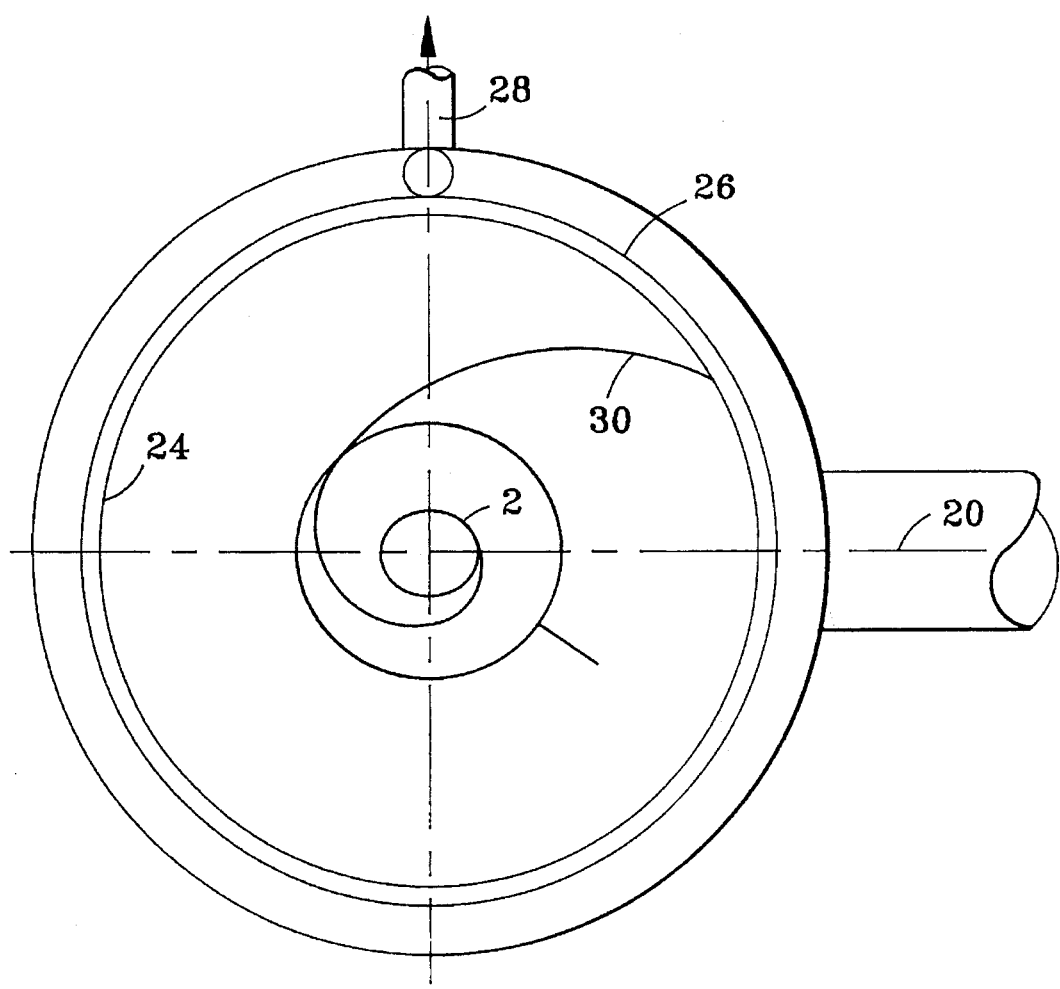
FIG. 6 shows a plan view of FIG. 5.

FIGS. 5 and 6 show another embodiment which is particularly suitable for grease separation or the separation of other particles which are floating due to the addition of air or flocculating agents. The height of the immersed baffle 24 is, for example, 15 cm, it being positioned such that 3 cm are immersed in the tank water level and, for example, 12 cm project out (a third is immersed and three quarters project out [sic]). The entire free surface within the immersed baffle 24 thus serves as a trap for floating substances and solids. Reference numbers which are the same as in the other figures denote the same objects. It can be seen how the floating substances accumulate within the upstream immersed baffle 24, and the open top gravity discharge, at a defined distance, can be seen at 22. This embodiment operates without a conduit pipe.

In the plan view of FIG. 5 shown in FIG. 6, a further supplement to the trap for floating substances and greases is provided. An inner immersed baffle 30 running helically in the direction of the center leads away from the upstream immersed baffle 24. The height of the inner immersed baffle is the same as the height of the first-mentioned upstream immersed baffle and is, for example, likewise 15 cm. The discharge is specified at 28 and the tank edge at 26. The sludge particles will thus move towards the center and be conveyed upwards in suspension. The air bubbling out of the mixture causes the formation above the liquid level, at 28, of the floating cover, comprising grease constituents, and, thereabove, a main chamber which keeps the cover of the tank dry inside.

Figure 7:
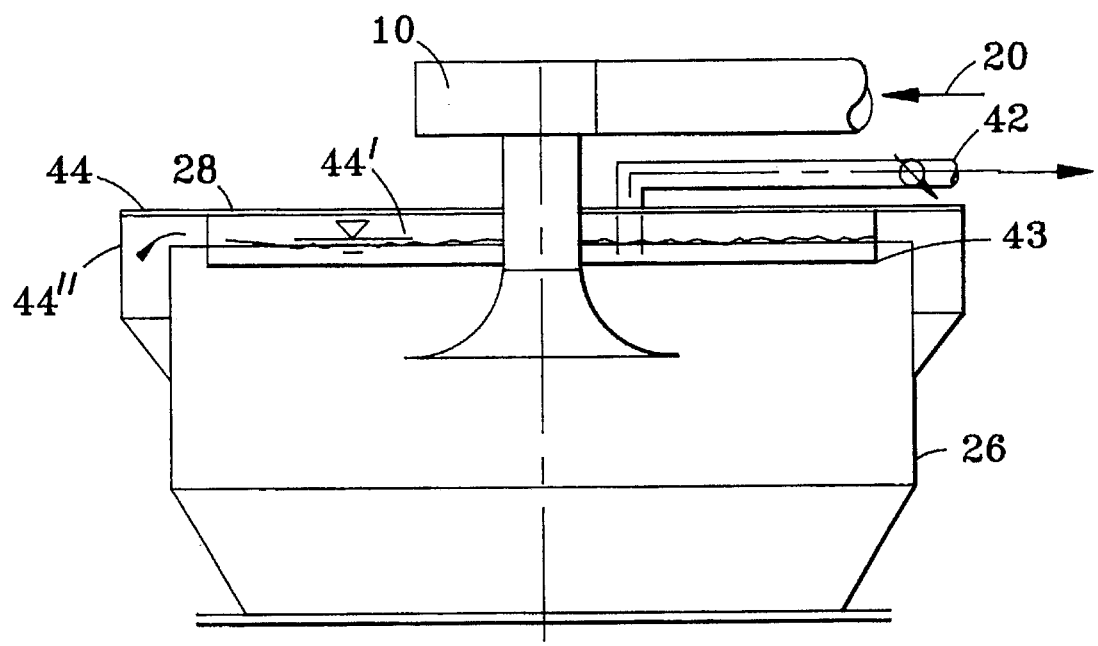
FIG. 7 shows a variant, in particular for liquids charged with floating grease and other constituents.

FIG. 7 shows a further embodiment. Here, an upstream immersed baffle 43 in the tank 26 is taken, in the same way as the inner immersed baffle, as far as the tank cover 44 and is welded thereto. This results in the formation, beneath the tank cover, of an air cushion in which the floating substances and greases 44' circulate. At 40, the air is increasingly compressed; the open top gravity discharge 44" can again be seen at 42. The Coanda trumpet 3 and the swirl chamber 10 are the same as in the preceding embodiments, and the inflow is specified at 20. Via the pipe 42 provided with shut-off means, sludge/floating substances 44' together with air can be discontinuously discharged or ejected or flung out owing to the superatmospheric pressure. This can take place, for example, every hour.

Figure 8:
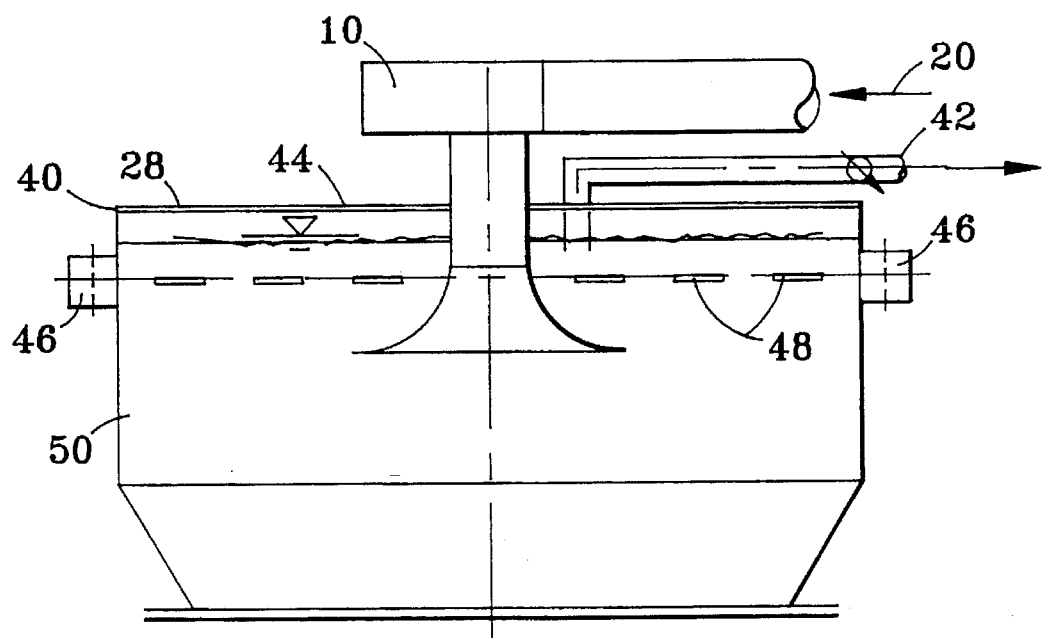
FIG. 8 shows a simplified variant of FIG. 7.

FIG. 8 shows a further embodiment, which is simplified with respect to FIG. 7. The tank wall 50 is simply taken as far as the cover and welded to said cover 44. The inflow 20, swirl chamber 10 and the Coanda trumpet 3 are unchanged. Floating greases collect at 44', an air cushion begins to form under increasing pressure at 40 and discharge again takes place via the pipe 42 for discharging floating substances and greases 28. The liquid discharge takes place via slots 48 which run into a pressure discharge line. This is configured as a pipe encircling the tank 50. A discharge under pressure thus takes place, i.e. this is actually a closed system. It can be seen that no pumps are used. The outer immersed baffle is dispensed with in this example. Only the inner immersed baffle is present, if we may put it this way.

The measure according to the invention can thus be carried out
a) without a conduit pipe (see the abovementioned advantages, in particular for the first embodiments)
b) with a closed conduit pipe. In this case, the conduit pipe is used, in particular, to stabilize the vortex core which spirals around the conduit pipe. This embodiment was not particularly shown in the drawings, and
c) with a conduit pipe, which is open at the top and bottom and is provided with holes over the circumference, as a variant the holes increasing in diameter to correspond to the flow conditions.

As in a further configuration of the measure according to the invention, the supply of air can also take place via a compulsory feed means. The compulsory feed means can, for example, be a compressor. Consequently, the special effects of the addition of air can be achieved.

Flocculating agents may preferably also be added from the top to the air intake, if the operator of the plant deems this to be necessary. If appropriate, flocculating agents may also be added to the compulsory feed means.

We claim:

1. A device for central feeding of a tank with fluid by utilization of the Coanda effect, comprising:

a vertical gravity outlet pipe oriented substantially vertically with respect to gravity, with a first end and a second end, said second end directed into a central portion of said tank;

a swirl chamber, said swirl chamber in flow communication, at an input end thereof, with input flow of said fluid and attached in flow communication, at an output end thereof, with said first end of said vertical gravity outlet pipe wherein fluid supplied to said swirl chamber is caused to move in a helical flow as it passes through said vertical gravity outlet pipe from said first end toward said second end of said vertical gravity outlet pipe;

a bell shaped body, trumpet-shaped in that said bell shaped body is configured similarly to a bell end of a trumpet and having a small diameter end and a fluid detachment end, said small diameter end connected to and adjoining said second end of said vertical gravity outlet pipe defining thereby a smooth and continuous region of transition from said second end of said vertical gravity outlet pipe to said small diameter end of said bell shaped body; and said vertical gravity outlet pipe and said bell shaped body cooperating in such a manner that said fluid emerges from said fluid detachment end of said bell shaped body in a direction substantially radial relative to said vertical gravity outlet pipe, said direction of said emerging fluid being a result of said Coanda effect and into said tank wherein said fluid is caused to radially symmetrically drain-off from said tank.

2. The device for central feeding of a tank with fluid by utilization of the Coanda effect, according to claim 1, wherein said bell shaped body widens in a manner such that axially directed tangent lines to a fluid contacting surface of said bell shaped body smoothly change from a substantially vertical with respect to gravity direction at said region of transition toward a substantially radial direction relative to said vertical gravity outlet pipe substantially at about said fluid detachment end of said bell shaped body.

3. The device for central feeding of a tank with fluid by utilization of the Coanda effect, according to claim 2, further comprising:

a conduit pipe centrally disposed in said vertical gravity outlet pipe, said conduit pipe having one open end open to atmosphere and another open end disposed substantially at said region of transition, said conduit pipe wall having a plurality of apertures therethrough, said conduit pipe providing thereby a supply of air to said vertical gravity outlet pipe; and said conduit second end opening and a fluid contact surface of said vertical gravity outlet pipe defining an annular gap in said region of transition, said annular gap and said bell shaped body cooperating in such a manner that said fluid emerges from said fluid detachment end of said bell shaped body in a direction substantially radial relative to said vertical gravity outlet pipe, said direction of said emerging fluid being a result of said Coanda effect and into said tank wherein said fluid is caused to radially symmetrically drain-off from said tank.

4. The device for central feeding of a tank with fluid by utilization of the Coanda effect, according to claim 3, further comprising means for regulation of said supply of air into said conduit pipe into said vertical gravity outlet pipe through said plurality of apertures.

5. The device for central feeding of a tank with fluid by utilization of the Coanda effect, according to claim 3, further comprising means for compulsory feeding of said supply of air into said conduit pipe into said vertical gravity outlet pipe through said plurality of apertures.

6. The device for central feeding of a tank with fluid by utilization of the Coanda effect, according to claim 3, wherein said one open end of said conduit pipe is substantially trumpet-shaped having a small diameter end and a larger diameter end, said small diameter end connected to said conduit pipe and said larger diameter end open to atmosphere and defining thereby a smooth and continuous region of transition from said larger diameter end to said small diameter end.

7. The device for central feeding of a tank with fluid by utilization of the Coanda effect, according to claim 3, further comprising an upstream immersed baffle, said upstream immersed baffle at least partially immersed below an expected level of fluid when said fluid is in said tank and wherein a portion of said upstream immersed baffle projects above said expected level of fluid, said upstream immersed baffle promoting separation of fluids from expected particles floating on said fluid when said fluid is in said tank.

8. The device for central feeding of a tank with fluid by utilization of the Coanda effect, according to claim 7, further comprising an inner immersed baffle running helically towards said central portion of said tank, said inner immersed baffle arranged within said upstream immersed baffle.

9. The device for central feeding of a tank with fluid by utilization of the Coanda effect, according to claim 8, wherein said tank is an open top gravity discharge tank in which fluid flows over an edge of at least one tank wall, said tank further comprising a tank cover positioned above said edge to permit fluid flow over said edge, and wherein said portion of said upstream immersed baffle projecting above said expected level of fluid of said tank is attached to said tank cover.

10. The device for central feeding of a tank with fluid by utilization of the Coanda effect, according to claim 2, further comprising an upstream immersed baffle, said upstream immersed baffle at least partially immersed below an expected level of fluid when said fluid is in said tank and wherein a portion of said upstream immersed baffle projects above said expected level of fluid, said upstream immersed baffle promoting separation of fluids from expected particles floating on said fluid when said fluid is in said tank.

11. The device for central feeding of a tank with fluid by utilization of the Coanda effect, according to claim 2, wherein said tank further comprises:

a tank cover sealed to an edge of a wall of said tank;

a plurality of slots each of said slots through said wall of said tank each slot of said plurality of slots peripherally disposed proximate an edge of said wall to permit a pressure discharge of fluid into a pressure discharge line.

12. A method for central feeding of a tank with fluid by utilization of the Coanda effect, said method comprising the steps of:

producing a helical flow of fluid to be centrally fed;

directing said helical flow of fluid through a vertical gravity outlet pipe, said vertical gravity outlet pipe having an axis substantially vertically directed with respect to gravity with a first end and a second end, said second end directed into a central portion of said circular tank; and providing a fluid contacting surface of a bell shaped body, trumpet-shaped in that said bell shaped body is configured similarly to a bell end of a trumpet, said bell shaped fluid contacting surface in flow contact with said helical flow of fluid emerging from said second end of said vertical gravity outlet pipe thereby utilizing the Coanda effect and centrifugal forces for deflecting the fluid in a direction substantially radial relative to said vertical gravity outlet pipe and guiding said helical flow of fluid emerging from said second end of said vertical gravity outlet pipe into substantially a radial direction relative to said vertical gravity outlet pipe and into said tank to separate constituents entrained in said liquid and producing thereby a radially symmetrical distribution of said fluid into said circular tank to separate constituents entrained in said fluid.

13. The method for central feeding of a tank with fluid by utilization of the Coanda effect, according to claim 12, further comprising introducing air into vertical gravity outlet pipe of said helical flow.

14. The method for central feeding of a tank with fluid by utilization of the Coanda effect, according to claim 13, further comprising placing flocculating agents into said air introduced into said vertical gravity outlet pipe.

15. The method for central feeding of a tank with fluid by utilization of the Coanda effect, according to claim 12, wherein said fluid is waste water, further comprising the step of separating said constituents entrained in said waste water thus clarifying said waste water.

* * * * *